United States Patent [19]

Gilberts

[11] 4,208,694

[45] Jun. 17, 1980

[54] LINE PROTECTOR

[75] Inventor: Alexander G. Gilberts, Algonquin, Ill.

[73] Assignee: Reliable Electric Company, Franklin Park, Ill.

[21] Appl. No.: 950,422

[22] Filed: Oct. 11, 1978

[51] Int. Cl.[2] .............................................. H02H 3/22

[52] U.S. Cl. ...................................... 361/119; 361/120

[58] Field of Search ......................... 361/117, 119, 120

[56] References Cited

U.S. PATENT DOCUMENTS

| | | |
|---|---|---|
| 3,254,179 | 5/1966 | Howard . |
| 3,254,181 | 5/1966 | Lemieux . |
| 3,569,786 | 3/1971 | Kunugi . |
| 3,651,440 | 3/1972 | Bahr et al. . |
| 3,755,715 | 8/1973 | Klayum et al. . |
| 4,002,952 | 1/1977 | Menninga . |
| 4,062,054 | 12/1977 | Simokat . |
| 4,128,855 | 12/1978 | Gilberts ................................ 361/119 |
| 4,132,915 | 1/1979 | Wilms ............................... 361/120 X |
| 4,158,869 | 6/1979 | Gilberts ............................ 361/119 X |

*Primary Examiner*—Harry E. Moose, Jr.

*Attorney, Agent, or Firm*—Trexler, Wolters, Bushnell & Fosse, Ltd.

[57] ABSTRACT

A line protector for protecting telephone lines and the like from over-voltage or over-voltage current conditions includes a primary arrester of the gas tube type and a secondary or back-up arrester of the air gap type. The gas tube is housed within a cup, and a flange on one of the electrodes of the gas tube cooperates with an end portion of the cup to define an annular configuration for the air gap. An insulator is adjacent to the electrode flange and serves as an abutment for the end portion of the cup to assist in maintaining the air gap. The insulator also maintains the gas tube within the cup.

6 Claims, 4 Drawing Figures

LINE PROTECTOR

BACKGROUND OF THE INVENTION

This invention relates to improvements in line protectors of the type used for protecting telephone lines and like communication lines from over-voltage and over-current conditions as may be caused by electrical power surges, lightning, and the like.

It is known to have protectors of this type include a surge voltage arrester of the cold cathode gas discharge tube type that serves as the primary arrester and source of protection. Such line protectors may also include a carbon or other type of air gap back-up protector in the event of a failure of the primary surge arrester. Such a failure is frequently a result of leakage of gas from the tube due to a broken seal or similar damage. It will be understood that a gas tube arrester which has failed in this manner will be difficult to detect because the line to which it is connected continues to operate properly. Thus, it is desirable to provide some type of air gap or secondary surge arrester as a "back-up" in the event of failure of the gas tube arrester. Line protector units having both gas tube arresters and back-up air gap arresters are known from U.S. Pat. Nos. to Klayum et al 3,755,715 and Bahr et al 3,651,440. In each of the foregoing devices numerous non-standard parts are used. This is in contrast with the desirability of having as many standard parts as possible, namely those parts which presently form portions of known types of line protectors.

SUMMARY OF THE INVENTION

An object of this invention is to provide an improved line protector that utilizes a gas tube as a primary surge arrester and an air gap as a "back-up" or secondary surge arrester in the event of failure of the gas tube arrester due to leakage or from other causes.

More specifically an object of this invention is to provide a line protector of the type stated which is compact and economical to produce, utilizing a number of standard type constuctional features that are found in line protectors of the so-called station protector type.

The line protector comprises a tubular cap, a metallic cage telescoped within the cap coaxial therewith and being axially slidable relative thereto, said cage comprising an end wall and a series of axially extending circumferentially spaced fingers projecting from the periphery of said end wall, a sealed cold cathode gas tube having axially spaced electrodes separated by a dielectric tubular insulator and so joined thereto as to form a sealed gas-filled primary arc gap within the gas tube, said electrodes also having exposed conductive electrode flanges at the opposite ends of the tubular insulator, an electrically conductive tubular structure telescoped within said cage, said gas tube being telescoped within the tubular structure, one electrode flange being an electrically conductive connection with said tubular structure and with said cage, an end portion of said tubular structure and said other electrode flange being spaced to provide an annular secondary arc gap in electrical parallel with said primary arc gap, an insulator adjacent to said other electrode flange and projecting axially therebeyond, said insulator being surrounded by said end portion and having an outer wall portion that is greater in diameter than the outer diameter of said other electrode flange, said end portion being confined between said outer wall portion and said fingers such that said outer wall portion prevents radially inward movement of said end portion to prevent closing of said secondary arc gap, and a member in electrical contact with said other electrode flange and projecting through said insulator, the breakdown voltage across the secondary arc gap being greater than the breakdown voltage across the primary arc gap but less than the breakdown voltage across such primary arc gap if the gas tube seal fails and the primary arc gap becomes exposed to ambient atmosphere.

In one form of the invention, the secondary arc gap is formed by having an end portion of the tubular structure diametrically enlarged relative to the adjacent part of the tubular structure. In another form of the invention, the outer diameter of one electrode flange and the adjacent part of the insulator are of reduced diameter to form the air gap.

DETAILED DESCRIPTION

Figure 2:
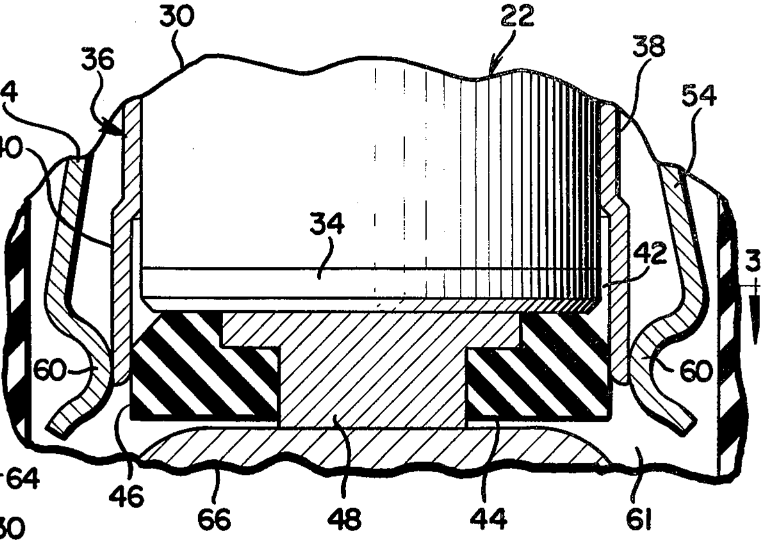
FIG. 2 is a fragmentary portion of FIG. 1 on an enlarged scale.
Figure 1:
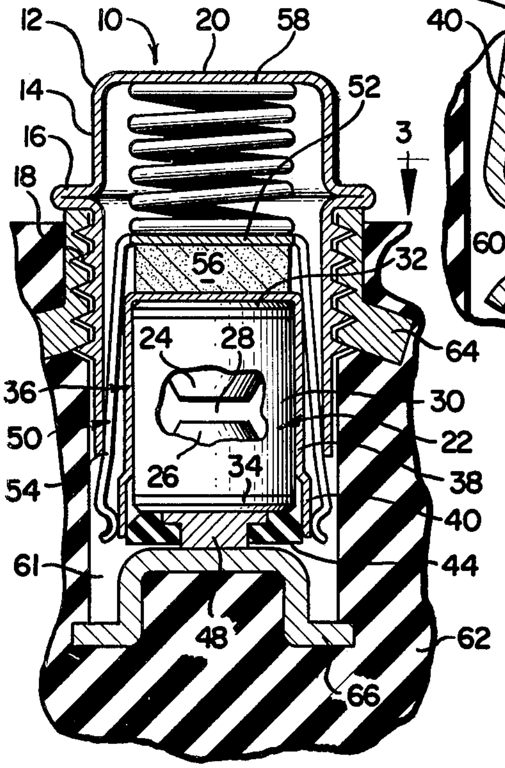
FIG. 1 is a longitudinal sectional view of a line protector constructed in accordance with the invention and shown mounted in position.

Referring now to the drawing there is shown a station protector 10 embodying the invention and including a sheet metal housing or cap 12 having an annular sidewall portion 14 containing an annular flange or stop-shoulder 16. Below the shoulder 16, the sidewall 14 is formed with a screw thread 18 for threading into the well 61 of a protector block 62, as will be presently more fully described. The cap 12 also includes an end wall 20 which is opposite to the open end of the cap 12.

Mounted within the cap 12 are several coaxial parts which provide the primary and secondary surge arrester structure of the invention. More specifically, there is a gas tube 22 having opposed electrodes 24, 26 that define an arc gap 28 therebetween. The electrodes 24, 26 are separated by a tubular insulator 30 of ceramic or the like to which the electrodes 24, 26 are brazed or soldered in the usual manner. Thus, the electrodes respectively have disc-shaped electrode flanges 32, 34 at which the electrodes 24, 26 are soldered to the ends of the insulator 30.

The gas tube 22 is coaxially housed within a tubular structure that is in the form of a cup 36 having a cylindrical sidewall 38. The gas tube 22 fits closely within the confines of the cup 36 although the gas tube may slide relative to the cup so as to facilitate assembly of those parts.

Figure 3:
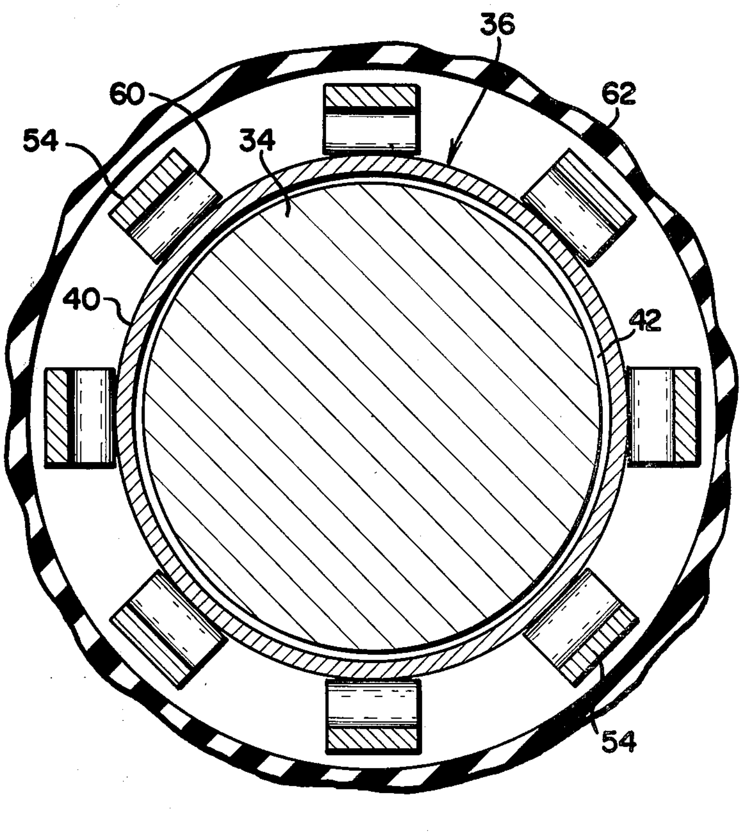
FIG. 3 is a fragmentary sectional view taken along Line 3—3 of FIG. 2.

Near the open end of the cup 36 the sidewall 38 has diametrically enlarged end portion 40 which surrounds the peripheral edge of the electrode flange 34. This end portion 40 is radially spaced from the electrode flange 34 and from an adjacent part of the insulator 30 so as to define a secondary air gap 42 of annular configuration, as best seen in FIGS. 2 and 3.

Contacting the exposed axial end surface of the electrode flange 34 and coaxial with the gas tube 22 is an insulator 44 having an outer cylindrical surface 46 of a diameter that is greater than the outer diameter of the flange 34. It will be seen also that the cup end portion 40 terminates in the region of the surface 46. Within the insulator 44 is a contactor 48 which is adapted to engage the electrode flange 34 and to provide electrical contact through the central portion of the insulator 44 and outwardly beyond the end surface of the insulator 44.

The metallic cup 36 is coaxially housed within a metallic grounding cage 50 having an end wall 52 and a plurality of circumferentially spaced, spring-like fingers 54. The spring fingers are compressed radially inwardly when the cup 36, together with the gas tube 22 and insulator 44, are inserted as a unit within the open end of the cup sidewall 14. In this regard a solder pellet 56 is inserted into the cage 50 prior to insertion of the assembly of the cup, the gas tube, and the insulator 44, whereby the solder pellet lies between the end wall of the cup 36 and the end wall 52 of the cage 50. A coil compression spring 58 bears at one end on the end wall 20 and at its opposite end against the flat end wall 52 of the grounding cage.

With the parts assembled as shown in the drawing, the insulator 44 prevents the gas tube 22 from coming out of the cup 36. The arcuate tips 60 of the spring fingers 54 apply inward pressure against the cylindrical cup end portion 40, pressing such end portion 40 against the insulator surface 46. This helps to maintain the air gap 42 constant and within tolerances.

The protector 10 is adapted to be mounted in the well 61 of the dielectric block or receptacle 62. This block, which is of known construction, has a metallic contact member 64 with an internal thread as shown for receiving the cap thread 18. This contact member 64 is usually connected to ground. At the bottom of the well 61 is a metallic contact 66 which is electrically connected to the electrode flange 34 through the contactor 48. Contact 66 is connected to the line to be protected. The insulator 44 helps insulate the cup end portion 40 from the line contact 66. In threading the protector 10 into the ground contact member 64 to the limit of the stop-shoulder 16, the extreme end of the contactor 48 will firmly engage the line contact 66 by reason of the force of the spring 58.

Figure 4:
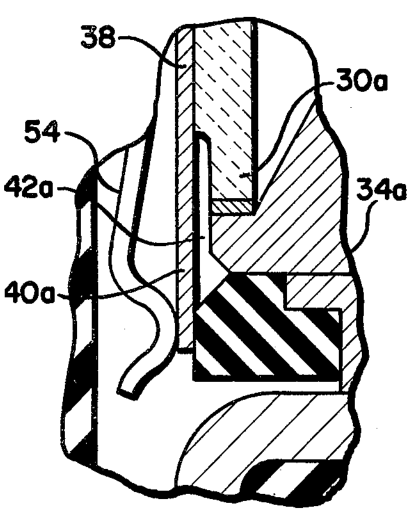
FIG. 4 is a fragmentary sectional view similar to a portion of FIG. 2 and showing a modified form of the invention.

A modified form of the invention is shown in FIG. 4 wherein like reference numerals indicate like parts, with the suffix "a". In FIG. 4, however, the end portion **40*a* is not diametrically enlarged but is simply a continuation of the right cylindrical sidewall 38 of the cup. The air gap 42*a* is formed by reducing the outer diameter of the flange 34*a* as well as the outer diameter of a small portion 30*a* of the adjacent part of the tubular insulator 30**.

From the foregoing, it will be seen that the arc gaps 28 and 42 are electrically coupled in parallel circuits from the line contact 66 to the ground contact 64. The width of the arc gap 42 is such that its breakdown voltage is greater than that of the breakdown voltage across the arc gap 28 of the gas tube 22. Consequently, when the gas tube arrester is operating properly as a primary surge arrester an over-voltage on the line to be protected will result in a discharge across the gas tube arc gap 28 to ground. The secondary surge arrester will not discharge across the air gap 42. However, if the gas tube should fail due to leakage, some protection will be afforded by a discharge to ground across the air gap 42 even though the breakdown voltage thereacross is somewhat higher than the breakdown voltage across the gas tube when the latter is functioning normally.

In an overcurrent condition on the line due, for example, to a prolonged voltage above the arcing voltage of the gas tube, the heat within the protector 10 will cause the solder pellet 56 to melt whereupon the force of the spring 58 will press the tips 60 of the grounding cage into direct metallic contact with the line contact 66. This results in a direct metallic connection of the line to be protected from the line contact 66 to the ground contact member 64.

The invention is claimed as follows:

1. A line protector comprising a tubular cap, a metallic cage telescoped within the cap coaxial therewith and being axially slidable relative thereto, said cage comprising: an end wall and a series of axially extending circumferentially spaced fingers projecting from the periphery of said end wall, a sealed cold cathode gas tube having axially spaced electrodes separated by a dielectric tubular insulator and so jointed thereto as to form a sealed gas filled primary arc gap within the gas tube, said electrodes also having exposed conductive electrode flanges at the opposite ends of the tubular insulator, an electrically conductive tubular structure telescoped within said cage, said gas tube being telescoped within the tubular structure, one electrode flange being in electrically conductive connection with said tubular structure and with said cage, an end portion of said tubular structure and said other electrode flange being spaced to provide an annular secondary arc gap in electrical parallel with said primary arc gap, an insulator adjacent to said other electrode flange and projecting axially therebeyond, said insulator being surrounded by said end portion and having an outer wall portion that is greater in diameter than the outer diameter of said other electrode flange, said end portion being confined between said outer wall portion and said fingers such that said outer wall portion prevents radially inward movement of said end portion to prevent closing of said secondary arc gap, and a member in electrical contact with said other electrode flange and projecting through said insulator, the breakdown voltage across the secondary gap being less than the breakdown voltage across the primary arc gap if the gas tube seal fails and the primary arc gap becomes exposed to ambient atmosphere.

2. A line protector according to claim 1 in which said end portion is diametrically enlarged relative to the adjacent part of the tubular structure.

3. A line protector according to claim 1 in which the outer diameter of said other electrode flange and of an adjacent part of the insulator are reduced relative to the outer diameter of a portion of the insulator remote from said other electrode flange.

4. A line protector having a primary surge arrester of the cold cathode gas tube type and a secondary surge arrester of the air gap type, the breakdown voltage of the secondary arrester being greater than the breakdown voltage of the primary arrester, said arresters being housed together and being connected to form parallel electric circuits from a line to be protected to ground, said secondary arrester having its air gap defined by an annular portion of a metallic cup that contains said gas tube and a rim of an electrode that forms part of said gas tube, said air gap being annular in configuration, means including an insulator adjacent to said electrode and maintaining said gas tube in said cup, and means pressing said annular cup portion radially inwardly against said insulator.

5. A line protector according to claim 4 including a metallic contactor in electrical contact with said electrode and projecting through said insulator.

6. A surge voltage arrester assembly having a primary surge arrester of the sealed cold cathode gas tube type and a secondary surge arrester of the air gap type, the breakdown voltage of the secondary arrester being greater than the breakdown voltage of the primary arrester, said arresters being housed together and being connected to form parallel electric circuits adapted to be connected from a line to be protected to ground, said gas tube being telescoped with a metallic cup having an open end, said secondary arrester having its air gap defined by a portion of said metallic cup and a rim of an electrode that forms part of said gas tube, said air gap being annular in configuration, means adjacent to said open end and including an insulator maintaining said gas tube in said cup, said insulator having an annular structure, and metallic means projecting through said insulator and surrounded by said annular structure and being in electrically conductive connection with said rim.

* * * * *